Jan. 4, 1944.　　　J. L. BRICKLEY　　　2,338,487
FISH GUARD
Filed June 18, 1942　　　2 Sheets-Sheet 1
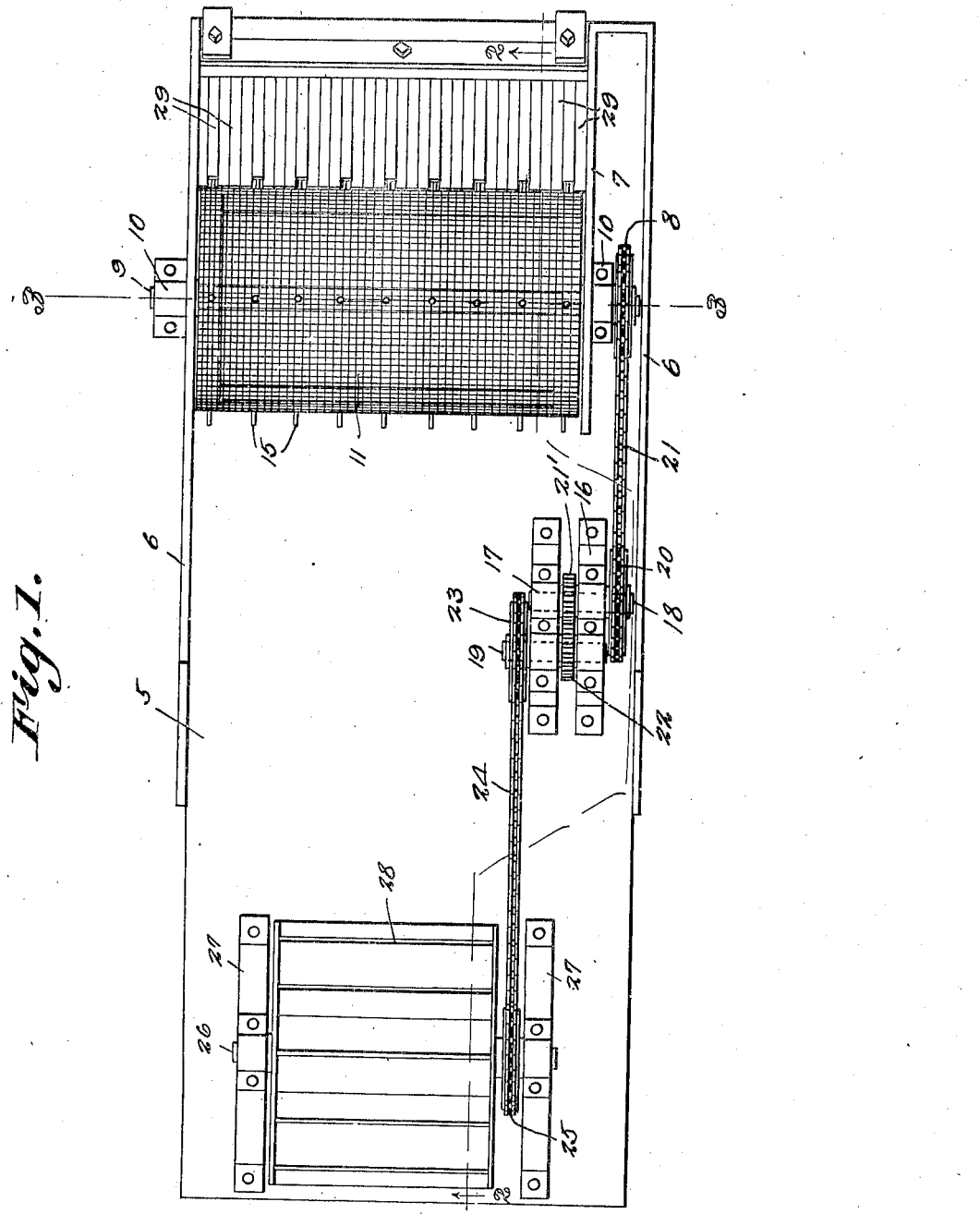
J. L. Brickley INVENTOR.

Jan. 4, 1944.   J. L. BRICKLEY   2,338,487
FISH GUARD
Filed June 18, 1942    2 Sheets-Sheet 2
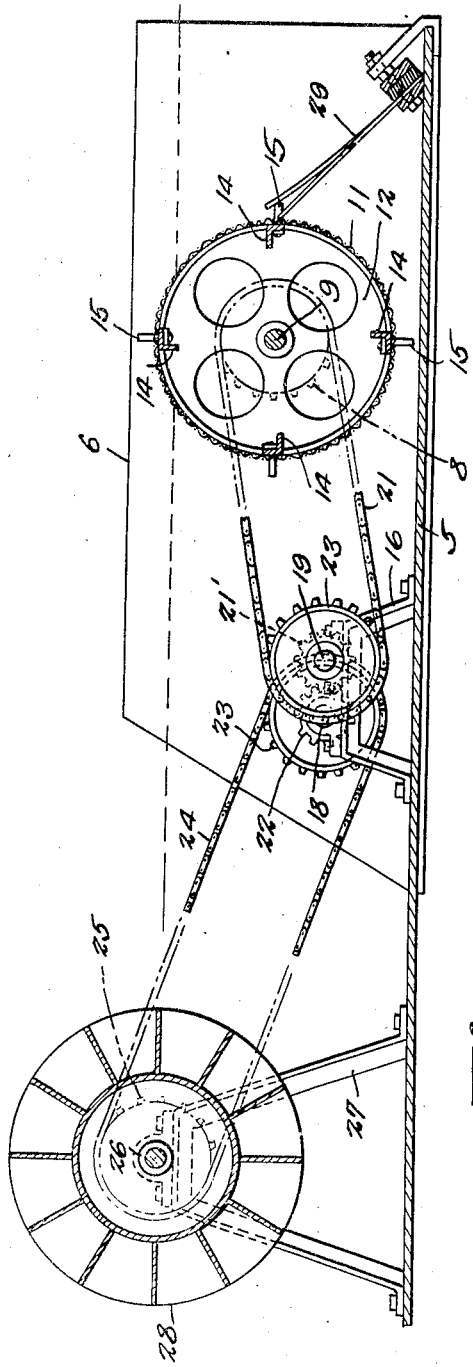
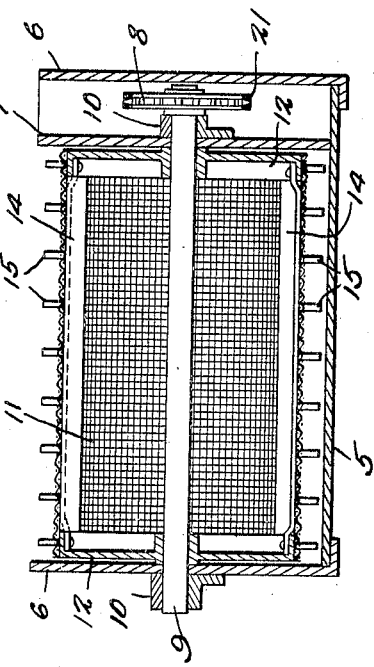
J. L. Brickley
INVENTOR.
BY Patented Jan. 4, 1944

2,338,487

UNITED STATES PATENT OFFICE 2,338,487

FISH GUARD

James L. Brickley, Darby, Mont., assignor of one-fifth to Charles A. Crawford and one-fifth to August R. Kurtz, Hamilton, Ohio Application June 18, 1942, Serial No. 447,595

2 Claims. (Cl. 210—173)

This invention has reference to fish guards designed for use in preventing fish from entering irrigating ditches with the flow of water from rivers and streams, into the ditches.

An important object of the invention is to provide a guard of this character which will prevent fish from entering the irrigating ditch in which the guard is positioned, and will at the same time operate to free itself of foreign matter such as sticks, leaves or the like which usually float on the surface of the water.

Still another object of the invention is to provide means for preventing fish from passing into the ditch at its end between the guard and bottom of the trough in which the guard is mounted.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

Referring to the drawings:

Figure 1 is a plan view of a fish guard, constructed in accordance with the invention.

Figure 2 is a sectional view taken on line 2—2 of Figure 1.

Figure 3 is a sectional view taken on line 3—3 of Figure 1.

Referring to the drawings in detail, the guard comprises a bottom 5 and side members 6, the bottom 5 being appreciably longer than the side members, so that the inner end of the bottom extends beyond the inner ends of the side members, as clearly shown by the drawings.

The side members are of heights so that the normal level of the water passing through the trough or between the side members 6, will be below the upper edges of the side members.

Mounted within the trough, and disposed in spaced relation with one of the side members 6, is a partition 7 which forms a compartment, with the adjacent side member 6, in which the sprocket 8 operates. Sprocket 8 is secured to one end of the shaft 9 that is mounted in bearings 10, the shaft 9 providing the support for the drum-like guard 11 which is constructed of foraminous material secured to the disks 12. Disks 12 have inwardly extended annular flanges 13 affording means whereby the foraminous material may be readily secured to the disks.

The diameter of the drum-like guard 11 is such that the upper portion of the drum will extend above the normal level of the water passing through the trough, to insure against fish passing over the drum.

Secured to the drum, and extending longitudinally thereof, are bars 14 which are provided with pins 15, the pins extending through the foraminous material of which the guard is constructed, to project beyond the periphery thereof. These pins are designed to pick up foreign matter which may be floating on the water passing through the trough, and carry the material over the drum, depositing it on the downstream side of the guard, thereby insuring against foreign material collecting on the upstream side of the guard to render the guard inoperative.

Brackets 16 and 17 are mounted on the bottom 5, at a point in spaced relation with the drum-like guard, and support bearings in which the shafts 18 and 19 operate, the shaft 18 being supplied with the sprocket 20, over which the chain 21 operates, the chain 21 also operating over the sprocket 8. Also mounted on the shaft 18 is a gear 21' that meshes with the gear 22, the gear 22 being mounted on the shaft 19. On one end of the shaft 19 is a sprocket 23 over which the chain 24 operates, which chain also operates over the sprocket 25 secured to one end of the shaft 26.

The shaft 26 operates in bearings supported by the uprights 27, the shaft 26 providing a support for the water-wheel 28 which is elevated so that water passing through the trough, will strike the underside of the water-wheel causing the water-wheel to rotate.

Secured at the front end of the trough or body portion of the guard, are spring-fingers 29 that are so arranged as to wipe the surface of the drum-like guard 11 as it rotates. These spring-fingers prevent fish from passing under the rotary drum-like guard. The flexibility of the spring-fingers will of course permit the pins to engage the fingers and pass thereunder, the spring-fingers returning to position after the pins pass thereunder.

In use, the fish guard is positioned in the main irrigating ditch from which several ditches may be supplied with water. However, it may be found desirable to place a fish guard in each irrigating ditch at the source of the water supply.

From the foregoing it will be seen that fish passing into the irrigating ditch with the water supply, will be blocked by contact with the rotating drum-like guard 11 with the result that the fish will return to the stream supplying water to the ditches.

What is claimed is:

1. In a fish guard for irrigating ditches, a trough-like body portion adapted to be positioned in an irrigating ditch, a rotary screening drum mounted within the entrance end of the trough-like body portion, rows of pins extending from the periphery of the screening drum, upwardly inclined spring-fingers mounted within the body portion and adapted to close the space between the sides of the trough-like body portion, said spring-fingers adapted to wipe the periphery of the drum, the lower ends of said fingers being secured to the bottom of the trough, and means operated by the flow of water through the trough for rotating said screening drum.

2. In a fish guard for irrigating ditches, a trough-like body portion, a rotary drum constructed of foraminous material mounted within the entrance end of the body portion, enlargements on the drum and extending beyond the periphery thereof, said enlargements adapted to pick up material at one end of the trough and carry the material into the opposite end of the trough, a stationary guard member mounted within the body portion at the entrance end thereof and adapted to close the space between the rotary drum and bottom of the body portion, said stationary guard comprising parallel fingers arranged in close engagement with each other, said guard fingers adapted to wipe the periphery of the rotary drum freeing material from the drum, and means for rotating the drum in the direction of travel of the water passing through the body portion.

JAMES L. BRICKLEY.

CERTIFICATE OF CORRECTION.

Patent No. 2,338,487.                                              January 4, 1944.

JAMES L. BRICKLEY.

It is hereby certified that error appears in the above numbered patent requiring correction as follows: In the grant, line 3, and in the heading to the printed specification, line 5, address of assignee, for "Hamilton, Ohio" read --Hamilton, Montana--; and that the said Letters Patent should be read with this correction therein that the same may conform to the record of the case in the Patent Office.

Signed and sealed this 9th day of May, A. D. 1944.

Leslie Frazer

Acting Commissioner of Patents.

(Seal)